United States Patent [19]
Ross

[11] Patent Number: 5,945,602
[45] Date of Patent: Aug. 31, 1999

[54] APPARATUS FOR MONITORING A SELF-SERVICE TRANSACTION TERMINAL

[75] Inventor: Gary A. Ross, Colinsburgh, United Kingdom

[73] Assignee: NCR Corporation, Dayton, Ohio

[21] Appl. No.: 08/886,482

[22] Filed: Jul. 1, 1997

[30] Foreign Application Priority Data

Dec. 18, 1996 [GB] United Kingdom .................... 9626202

[51] Int. Cl.[6] .................................................. G01H 17/00
[52] U.S. Cl. .............................................. 73/570; 340/566
[58] Field of Search .............................. 367/96; 340/541, 340/426, 566; 73/570

[56] References Cited

U.S. PATENT DOCUMENTS

| | | | |
|---|---|---|---|
| 4,366,544 | 12/1982 | Shima et al. | 364/550 |
| 4,420,751 | 12/1983 | Paganini et al. | 340/825.33 |
| 4,988,979 | 1/1991 | Sasaki et al. | 340/683 |
| 5,519,669 | 5/1996 | Ross et al. | 367/93 |

FOREIGN PATENT DOCUMENTS

| | | |
|---|---|---|
| 0227138 | 7/1987 | European Pat. Off. . |
| 0374481 | 6/1990 | European Pat. Off. . |
| 2590704 | 5/1987 | France . |
| 2269205 | 2/1994 | United Kingdom . |
| 9009644 | 8/1990 | WIPO . |

*Primary Examiner*—George Dombroske
*Assistant Examiner*—Jewel Thompson

[57] ABSTRACT

A media handling apparatus such as a cash dispenser apparatus (16) includes a plurality of sensors made up of microphones (38) and acoustic emission (AE) sensors (42) which are respectively arranged to sense the acoustic outputs of different parts of the apparatus. The apparatus includes data storage means (50) arranged to store digital representations of normal outputs of the sensors (38,42) respectively corresponding to normal operation of said parts, and processing means (4) arranged, in operation, to respectively compare digital representations of the acoustic outputs of the sensors (38,42) with the stored digital representations of the normal outputs of the sensors (38,42). On the basis of this comparison, the data processing means (4) makes a determination as to whether any of the sensors (38,42) has an abnormal acoustic output. In this way, an indication of the state of health of the apparatus (16) is provided.

19 Claims, 6 Drawing Sheets

6,945,602

APPARATUS FOR MONITORING A SELF-SERVICE TRANSACTION TERMINAL

BACKGROUND OF THE INVENTION

The invention relates to media handling apparatus, and has particular, but not exclusive, application to a transaction terminal, such as, for example, an automated teller machine (ATM).

One function of an ATM is to dispense bank notes to a user. A standard ATM having the facility to dispense bank notes includes electronic control means, in the form of a CPU, connected to both a cash dispenser unit and a user interface device. As is well known, in operation of such an ATM a user inserts a user identity card into the machine and then enters certain data, such as a personal identification number (PIN) and the quantity of currency required to be dispensed, by means of a key pad incorporated in the user interface device. The ATM will then process the requested transaction, dispense notes extracted from one or more storage cassettes within the currency dispenser unit, update the user's account to reflect the transaction and return the card to the user as part of a routine operation.

In order to dispense cash to a user, bank notes held in one or more of the storage cassettes in the cash dispenser unit of the ATM are extracted by pick means and fed one by one to stacking means from where they are fed to an output slot in the ATM. The feed means for feeding notes to and from the stacking means typically include arrays of rubber rollers and/or belt means.

One form of pick means commonly used in ATMs includes pivotably mounted pick arms provided with rubber suction pads and connected to an air pump means. In operation, a bank note is picked out of an associated storage cassette by a pair of pick arms and moved into engagement with the note feed means.

In operation of an ATM, various malfunctions may occur from time to time. For example, in the cash dispenser unit of an ATM bank notes may become jammed in the feed path, the pick means may fail to pick a bank note from the associated storage cassette, there may occur multiple feeding in which two or more notes are fed in superposed relationship to the stacking means or jamming of a drive motor may occur. These problems may be caused by wear or distortion of components in the dispenser unit.

When ATM malfunctions, such as those discussed above, occur the ATM may be shut down until the malfunction is rectified, which will require the intervention of a trained operator, or the picked notes may be diverted to a purge bin resulting in less efficient operation of the ATM.

SUMMARY OF THE INVENTION

It is an object of the present invention to alleviate the problems discussed above to enhance operation of a media handling apparatus.

According to the present invention there is provided a media handling apparatus, characterized by a plurality of acoustic sensors which are respectively arranged to sense the acoustic outputs of different parts of said apparatus, storage means arranged to store digital representations of normal outputs of said sensors respectively corresponding to normal operation of said parts, and processing means arranged, in operation of said apparatus, to respectively compare digital representations of the acoustic outputs of said sensors with the stored digital representations of the normal outputs of said sensors, and arranged, on the basis of such comparison, to provide an indication as to whether any of said sensors has an abnormal acoustic output.

In a preferred embodiment of the present invention, said acoustic sensors comprise at least one sound-pressure microphone for detecting the air-borne acoustic output of a part of the apparatus, and/or at least one acoustic emission (AE) sensor for detecting the structure-borne acoustic output of another part of the apparatus.

As is well known, in operation of a sound-pressure microphone, pressure waves in the air cause movement of a diaphragm in the microphone which in turn causes a variation in the analog output voltage of the microphone. A sound-pressure microphone used in a cash dispensing unit in accordance with the invention would typically pick up acoustic outputs in the range of 20 Hz to 5 kHz. Preferably one or more unidirectional microphone would be used in a cash dispensing unit, since such microphone has a relatively high sensitivity in the direction in which it is pointed and so is less sensitive to environmental or ambient noise such as traffic noise and noise from air conditioning, road works, pedestrians, etc. A suitable unidirectional, sound-pressure microphone for use in the present invention is a Shure Unidyne model 515 SD microphone.

An AE sensor is a piezoelectric crystal device which detects an ultrasonic structure-borne acoustic output brought about by changes of strain energy within a structure, and which operates with a typical bandwidth of 10 kHz to 1 MHz to produce an analog voltage output. AE sensors are substantially immune to environmental or ambient noise. A suitable AE sensor for use in the present invention is a Physical Acoustics Corporation model S140B sensor.

BRIEF DESCRIPTION OF THE DRAWINGS

An embodiment of the present invention will now be described, by way of example, with reference to the accompanying drawings, in which.

DETAILED DESCRIPTION

Figure 1:
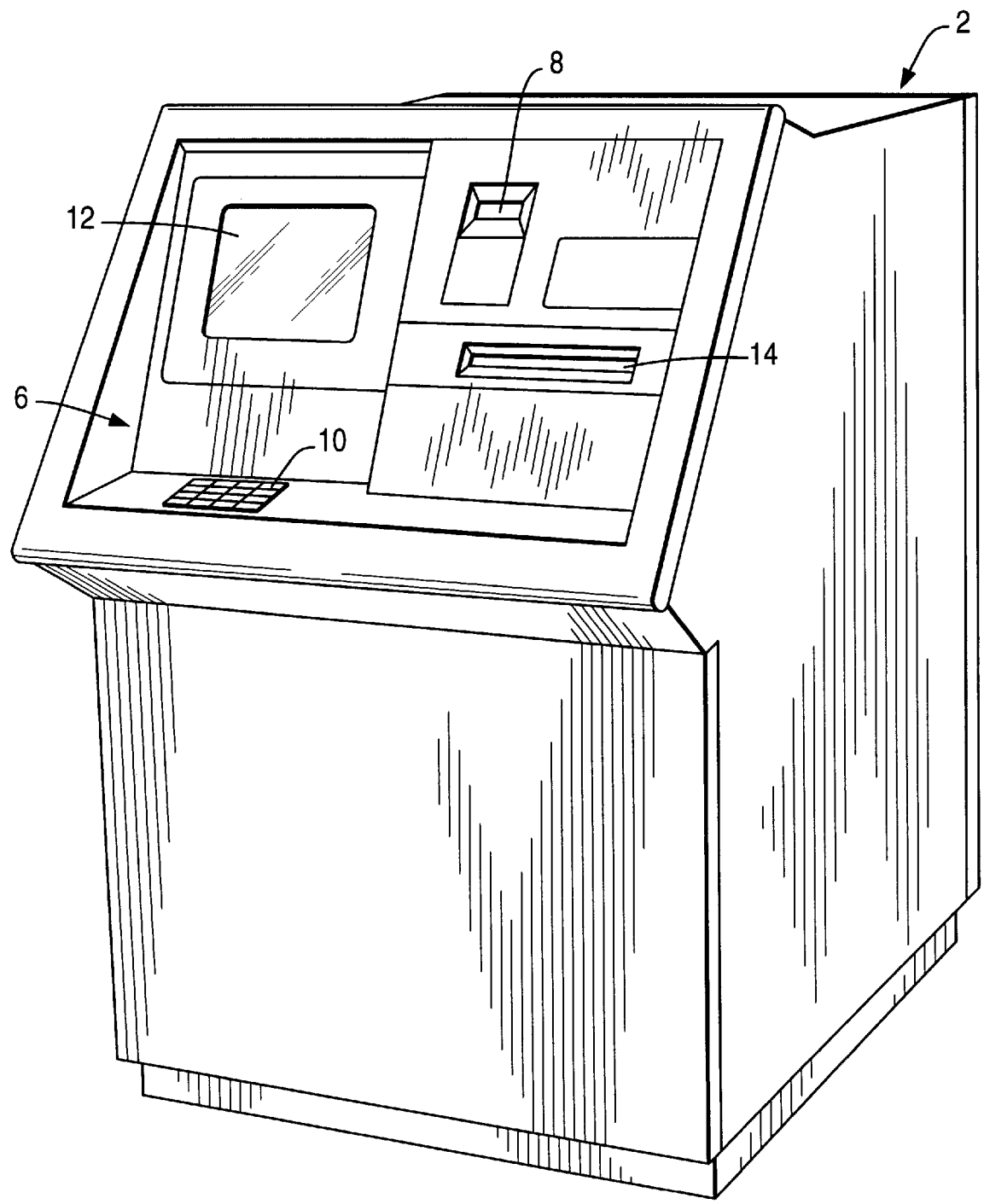
FIG. 1 is a perspective view of an ATM having a cash dispenser unit in accordance with the present invention.
Figure 2:
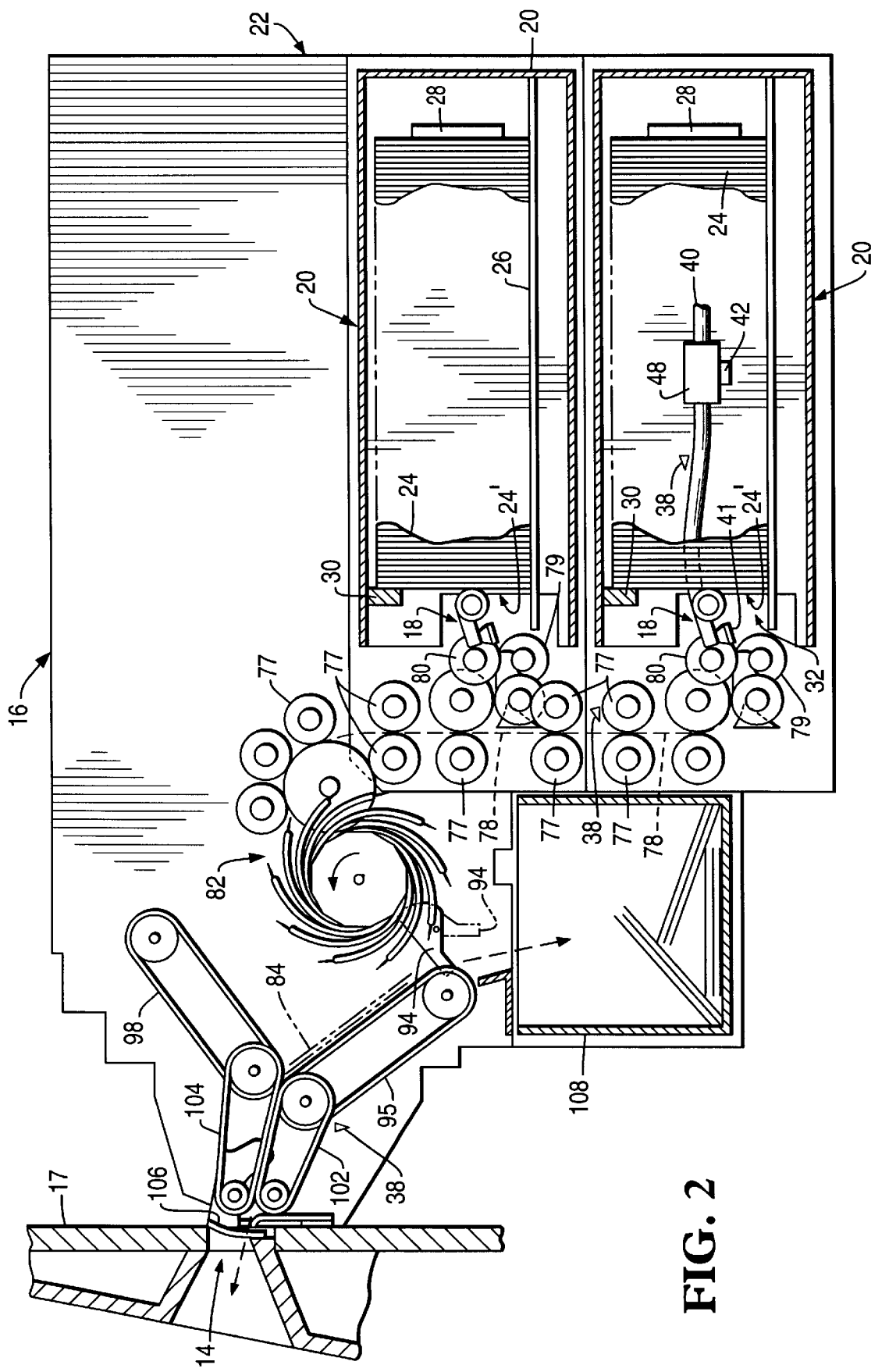
FIG. 2 is a side elevational view of the cash dispenser unit of the ATM of FIG. 1, the dispenser unit having two pick means, and parts of said unit being omitted.
Figure 3:
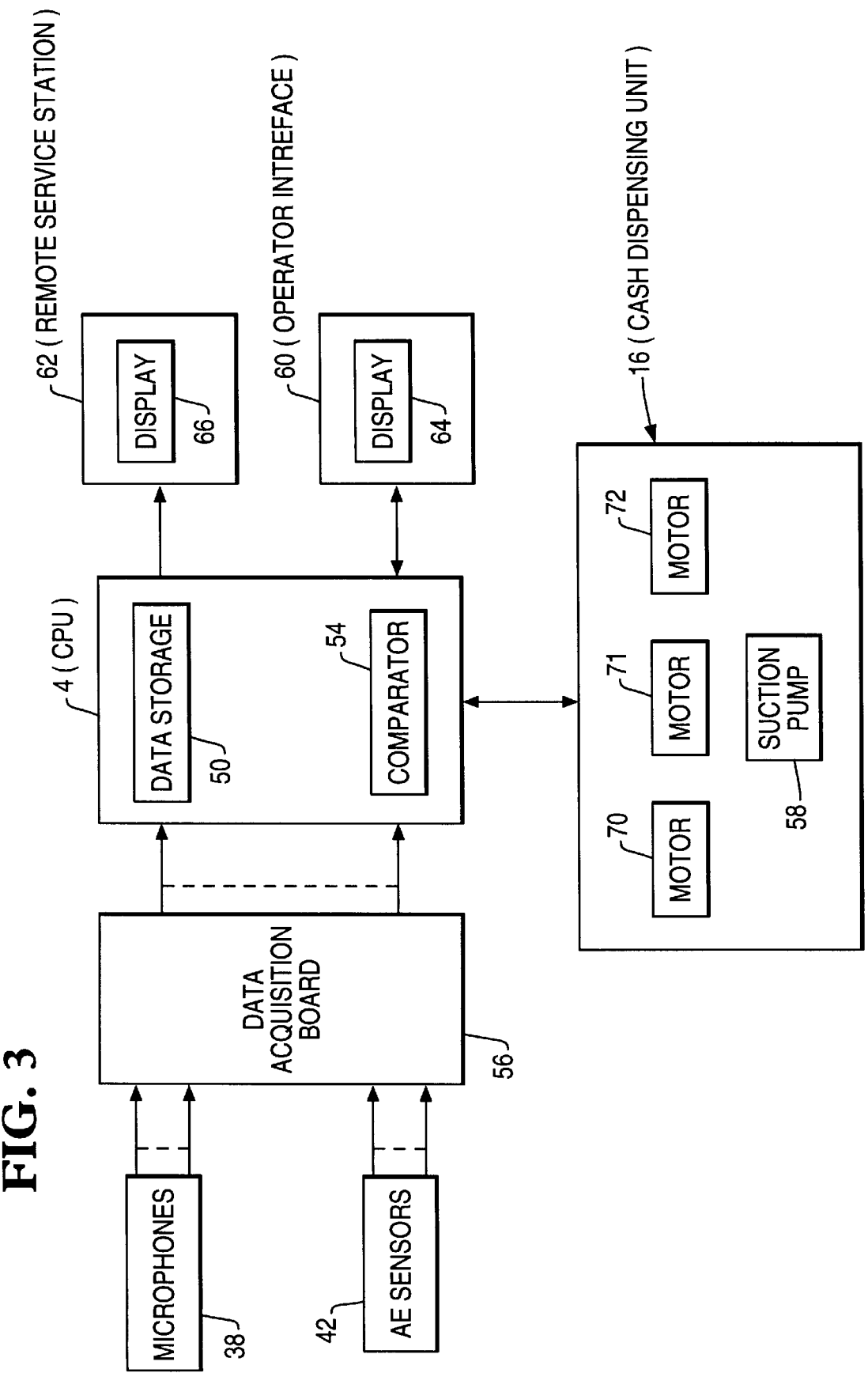
FIG. 3 is a block circuit diagram of the cash dispenser unit of FIG. 2.

With reference to FIGS. 1 to 3 there is illustrated an ATM 2 having a cash dispenser unit 16 in accordance with the present invention, the ATM 2 including a control means in the form of a central processor unit (CPU)4 (FIG. 3) which has stored therein a control program which controls the operation of the ATM 2.

As shown in FIG. 1, the ATM 2 includes a user interface 6 incorporating a slot 8, connected to a conventional card reader (not shown), for receiving a user identity card, a key pad 10 for inputting data, a screen 12 for displaying user information, and an output slot 14 for dispensing bank notes to a user. The CPU 4 of the ATM 2 is connected to the cash dispenser unit 16 (FIGS. 2 and 3) and to a conventional printer (not shown) for printing documents such as statements, receipts and account balances. The case dispenser unit 16 is mounted in a safe 17 part only of which is shown in FIG. 2, the output slot 14 being provided in one wall of the safe 17.

Referring now particularly to FIG. 2, the cash dispenser unit 16 includes two similar pick mechanisms 18 arranged one above the other and respectively associated with two storage cassettes 20 which are removably mounted in a supporting framework 22 of the dispenser unit 16. Each of the storage cassettes 20 is arranged to contain a stack of bank notes 24, corresponding long edges of which are supported on a horizontal support plate 26 mounted in the storage cassette 20. The stack of notes 24 in each storage cassette 20 is urged by a spring loaded pusher member 28 towards a stop member 30 mounted at the front end of each storage cassette 20. An opening 32 is formed in the front end of each storage cassette 20, the opening 32 being closed normally by conventional shutter means (not shown) when the storage cassette 20 is not mounted in the dispenser unit 16. When a storage cassette 20 is mounted correctly in the dispenser unit 16, the shutter is automatically retracted to enable notes 24 to be extracted through the opening 32 by the associated pick mechanism 18.

The dispenser unit 16 also incorporates feed rollers 77 for feeding the bank notes 24 along a feed path 78 from each of the storage cassettes 20 to a stacking wheel 82 and then to the output slot 14, the rollers 77 being associated with co-operating first and second rollers 79 and 80 which are positioned at the opening 32 in the front of each storage cassette 20.

In the course of a normal pick operation the lower long edge of the first bank note 24' of the stack of notes 24 in a selected one of the storage cassettes 20 is pulled partly out of the storage cassette 20 under the suction force applied by associated pivotally mounted suction pads 41, and is fed between the associated first and second rollers 79,80. As the rollers 79,80 engage the bank note 24' they urge the note 24' into the feed path 78 for feeding by the rollers 77. The pick mechanisms 18 incorporating the pivotally mounted suction pads 41 are driven by an electric motor 70 (FIG. 3), and the mechanism for feeding bank notes 24 along the feed path 78 is driven by an electric motor 72 (FIG. 3).

The stacking wheel 82 is arranged to receive notes 24 fed along the feed path 78. The stacking wheel 82 serves to stack notes 24 picked from one or both of the storage cassettes 20 so as to form a bundle 84 of notes for delivery to the output slot 14 for collection by the user.

Assuming that none of the notes 24 in the bundle 84 have been rejected for any reason, belt means 98 are pivoted into cooperative relationship with belt means 95, and the belt means 95 and 98 are operated so as to drive the bundle 84 to an adjacent pair of belt means 102 and 104. The belt means 102 and 104 serve to drive the bundle 84 through the output slot 14 to a position where the bundle 84 can be collected by the user of the ATM 2, a shutter 106, which serves to close the slot 14 when the ATM 2 is not in operation, having previously been retracted to an open position.

It should be understood that the belt means 95 and 98 are mounted in resilient relationship relative to each other, and the belt means 102 and 104 are also mounted in resilient relationship relative to each other, so that bundles of notes of varying thickness can be held between, and fed by, the belt means 95 and 98 and the belt means 102 and 104.

The belt means 95,98,102 and 104 are driven under the control of the CPU 4 by a bidirectional motor 71 (FIG. 3).

If one or more of the notes in the bundle 84 have been rejected for any reason, then a stripper plate assembly 94 is rocked into the position shown in chain outline in FIG. 2, and the belt means 95 and 98 are operated to feed the bundle 84 in a direction opposite to the normal feed direction, the bundle 84 being deposited in a purge bin 108 via an opening in the top thereof. Also, if a bundle 84 of notes or a single note 24 is mis-aligned or becomes jammed between the stacking wheel 82 and the output slot 14 then the motor 71 can be operated so as to cause the belt means 95,98,102 and 104 to drive the note 24 or bundle 84 of notes in the forward and the reverse direction repeatedly, in an attempt to unblock the currency jam or to realign the bank note 24 or bundle 84 of bank notes.

The cash dispenser 16 includes a plurality of unidirectional, sound-pressure microphones 38 (FIGS. 2 and 3), which are positioned at different locations within the dispenser 16 as will be described later, and a plurality of acoustic emission (AE) sensors 42 (FIGS. 2 and 3) which are respectively physically attached to different components of the dispenser 16.

As it is found that little significant acoustic output above 5 kHz is picked up in operation by the microphones 38, the microphones 38 operate with only one quarter the audible frequency range, thereby reducing the amount of data required to be detected, stored and analyzed. Also, although AE sensors can operate with a frequency range of 10 kHz to 1 MHz, the AE sensors 42 used in the cash dispenser 16 operate with a frequency range of 10 kHz to 50 kHz since most of the significant information is contained in this frequency range of the acoustic outputs of the components with which the AE sensors 42 are associated.

The microphones 38 and AE sensors 42 can be arranged to detect acoustic outputs of parts of the dispenser 16 which are of particular interest so far as the state of health of the dispenser 16 is concerned. In the present embodiment, the microphones 38 and sensors 42 have been placed at a selection of locations for the purpose of obtaining information relating to a number of different dispenser malfunctions, such as bank note jamming brought about by wear or distortion of associated drive means, or wear on components such as the vacuum line 40 between the suction pump 58 and each pick means 80, or pending motor failure. It is found that it is frequently the case that when failure of a mechanical device is approaching there is a gradual increase in the acoustic output.

FIG. 2 illustrates the location of a first microphone 38 adjacent the vacuum line 40 between the pick mechanism 18 associated with the lower of the two currency cassettes 20 and a suction pump 58 (FIG. 3), to detect vacuum pressure errors in the vacuum line 40. A similar microphone (not shown) is located in the corresponding position in relation to the vacuum line (not shown) of the upper of the two currency cassettes 20. An error in a vacuum line 40 can result from a puncture in the line 40 or a blockage of the line 40. Another microphone 38 is shown positioned adjacent the feed path 78 in the vicinity of a pair of the feed rollers 77, to detect jammed bank notes in the feed path 78. Additional microphones (not shown) are located along the feed path 78 to detect bank note jams along the length of the feed path 78. A further microphone 38 is located adjacent the belt means 95,98 and 102, 104 to detect possible problems in the tensioning of the belt means 95,98 and 102,104. For example, a reduction in belt tension can result from a lengthening of the belts brought about by wear or distortion.

One of the AE sensors 42 is physically attached to the casing of the suction pump 58 (FIG. 3), and another AE sensor 42 is physically attached to a solenoid valve 48 (FIG.

2), in the vacuum line 48 between the suction pump 58 and each pick mechanism 18. Other AE sensors 42 are respectively physically attached to the casings of the motors 70,71 and 72 (FIG. 3).

Figure 4A:
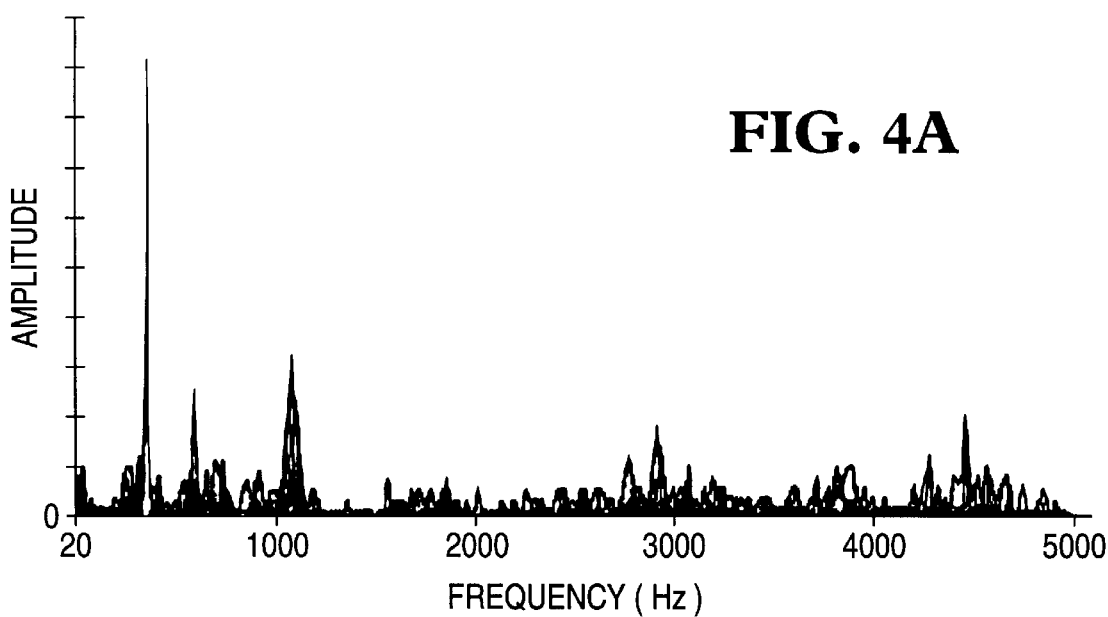
FIGS. 4 to 6 are representations of amplitude spectra representing acoustic outputs of a number of microphones and of a typical AE sensor included in the cash dispenser unit.
Figure 4A:
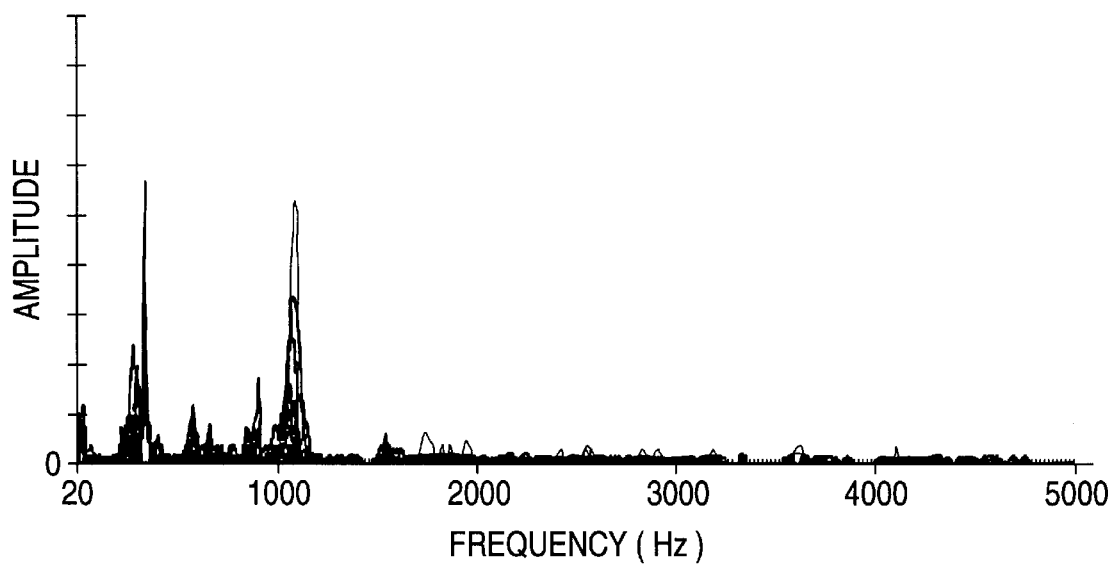
Figure 4A:
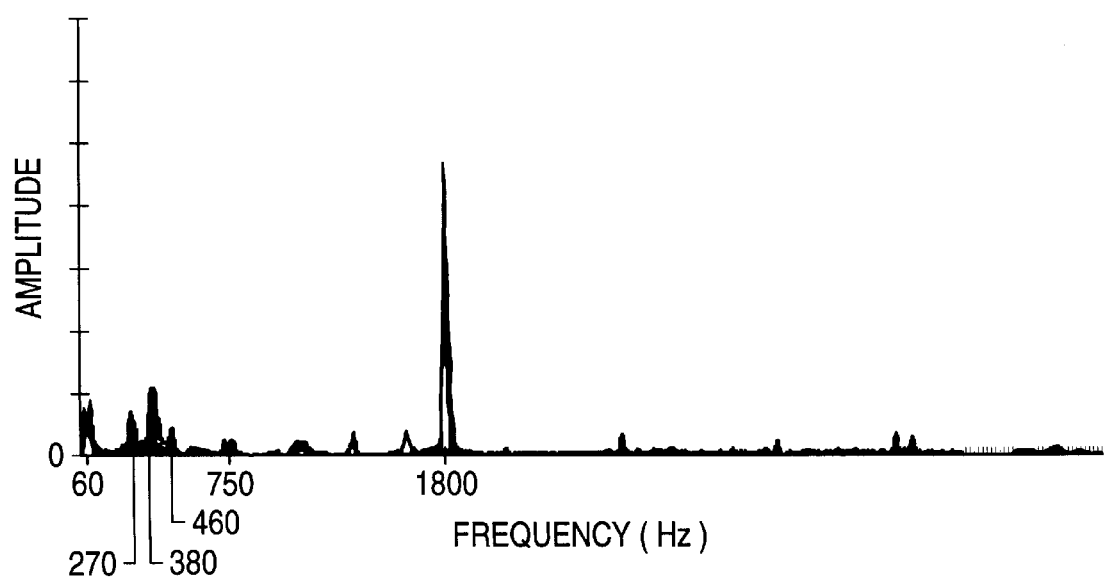
Figure 5B:
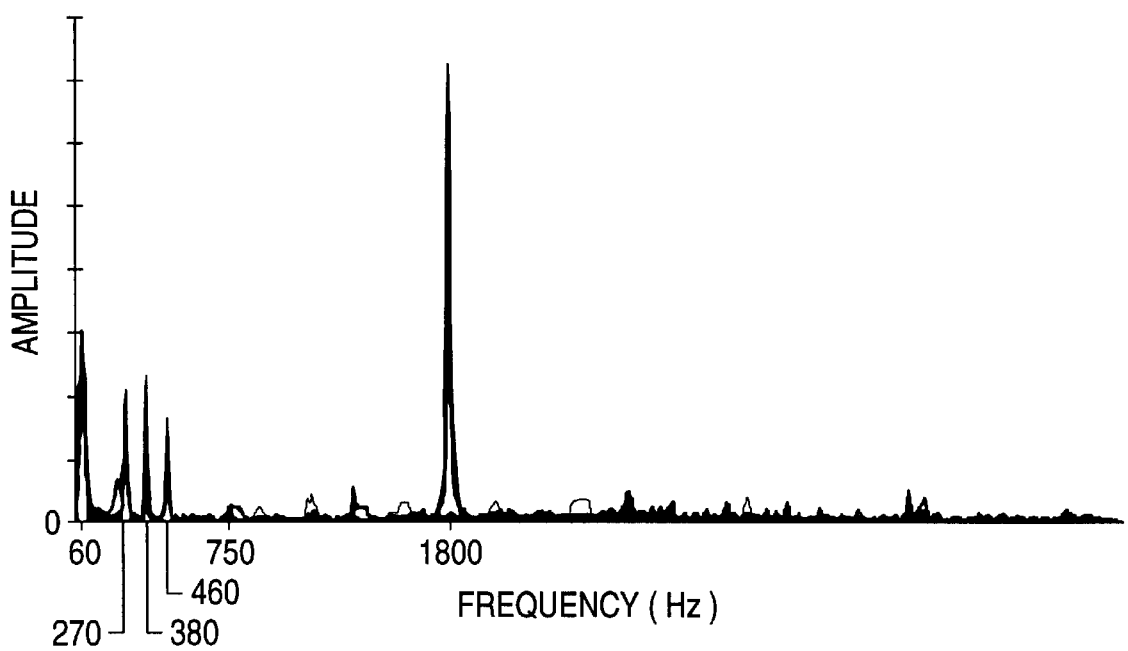
Figure 5C:
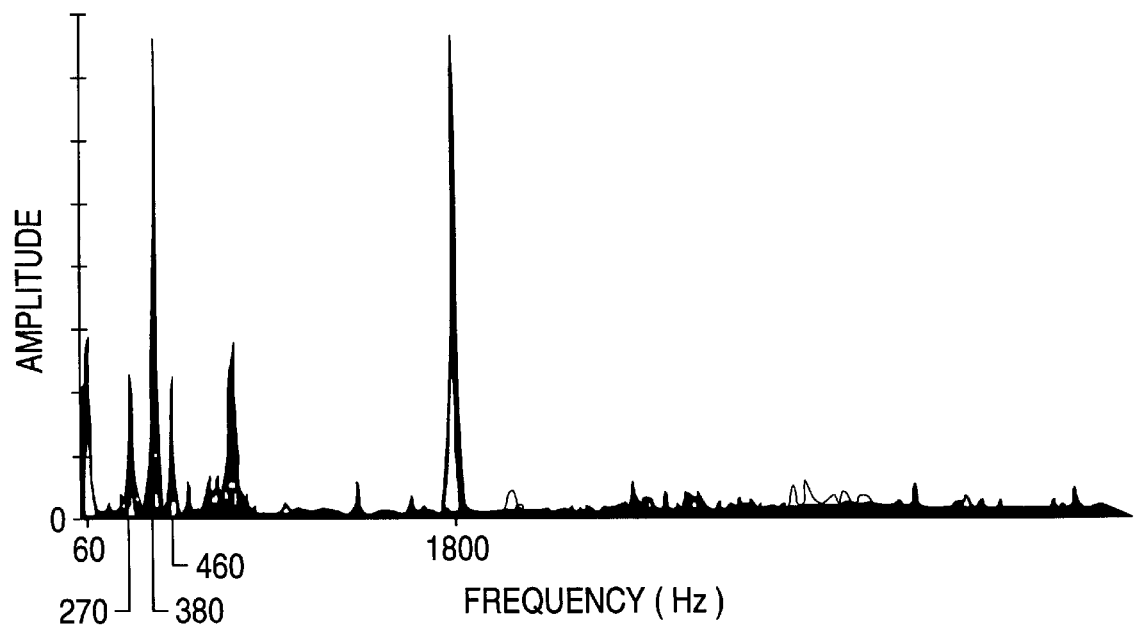
Figure 5D:
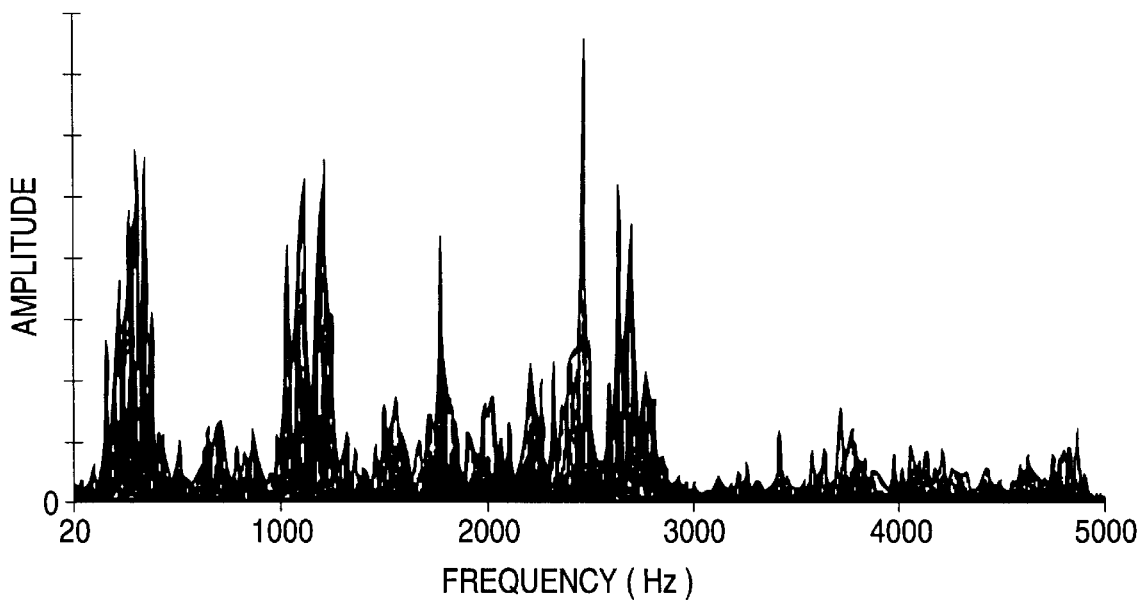
Figure 6:
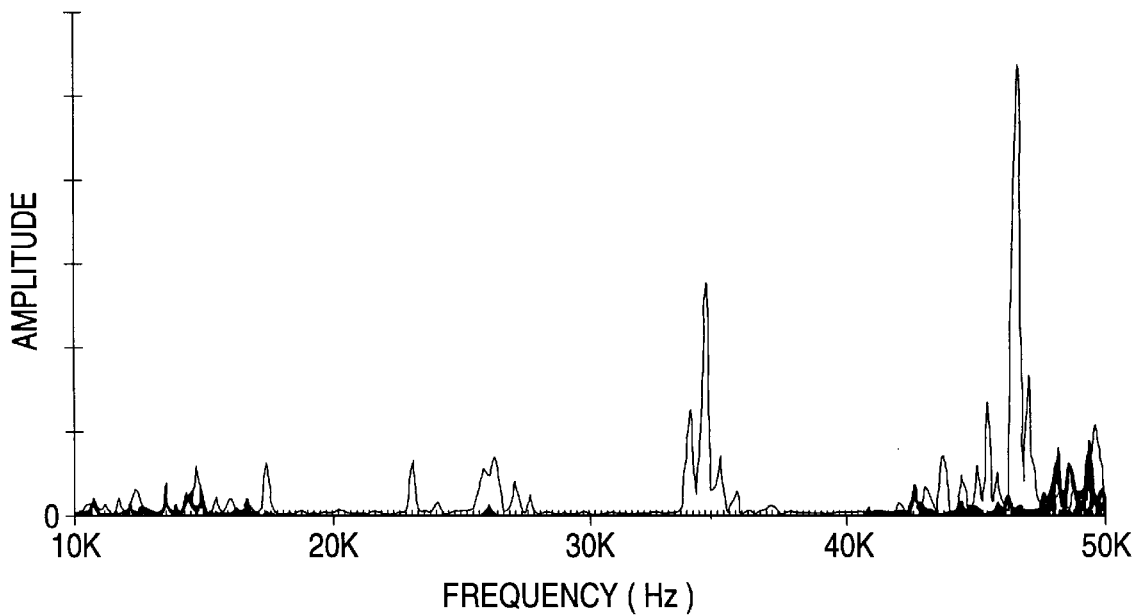

Referring now to FIGS. 4 to 6 there are shown therein various amplitude spectra each of which represents the acoustic output of one of the microphones 38 or AE sensors 42. Each spectrum is a plot of the voltage amplitude of the output against frequency, the frequency range being between about 20 kHz and 5 kHz for a microphone 38, and between about 10 kHz and 50 kHz for an AE sensor 42. It should be understood that each microphone 38 or AE sensor 42 incorporates appropriate amplification means, and possibly filtering means, for ensuring that a satisfactory acoustic output is obtained for each device.

Thus, FIG. 4A illustrates the acoustic signal generated by the microphone 38 located adjacent the vacuum line 40, when no pressure error is detected. FIG. 4B illustrates the acoustic signal generated by this microphone 38 when a fault has occurred in the vacuum line 40, which may result in the failure of the relevant pick means 18 to pick a bank note from the currency cassette 20.

FIG. 5A illustrates the acoustic signal generated by the microphone 38 located adjacent the belts 95,98 and 102,104 when these belts are tensioned correctly; FIG. 5B illustrates the acoustic signal generated when the tension in the belts 95,98 and 102,104 is less than the desired belt tension; FIG. 5C illustrates the acoustic signal generated when the tension in the belts 95,98 and 102,104 is greater than the desired belt tension; and FIG. 5D illustrates the acoustic signal generated when bank notes have become jammed in the feed path defined by the belts 95,98 and 102,104.

FIG. 6 illustrates the acoustic signal generated by the AE sensor 42 located in contact with the casing of the motor 71 when this motor is functioning correctly.

Referring now particularly to FIG. 3, the acoustic outputs of the microphones 38 and the AE sensors 42 are applied to a data acquisition board 56 which is connected to the CPU 4. The data acquisition board 56 converts the analog outputs of the microphones 38 and AE sensors 42 into digital form for application to the CPU 4. The board 56 has a 16 bit resolution and has a sampling rate of up to 100 kHz. The acoustic outputs of the microphones 38 are sampled at a rate of 10 kHz (i.e. twice the maximum frequency of these outputs), and the acoustic outputs of the AE sensors 42 are sampled at a rate of 100 kHz (i.e. twice the maximum frequency of these last-mentioned outputs).

The CPU 4 includes data storage means 50 in which is stored data representative of the normal acoustic outputs of the microphones 38 and AE sensors 42 when the associated parts of the dispenser 16 are operating normally, and also data representative of the acoustic outputs of the microphones 38 and AE sensors 42 when the associated parts of the dispenser 16 are malfunctioning in a predetermined manner. It should be understood that for each of the microphones 38 and AE sensors 42 there could be stored data representative of the acoustic outputs corresponding to two or more predetermined types of malfunction. The CPU 4 is coupled to an operator interface 60 and to a remote service station 62 as will be described in more detail later. The operator interface 60 and the remote service station 62 respectively include display means 64 and 66 for displaying information to a service engineer or other authorized person.

In regard to the stored data a known statistical pattern recognition technique is used. This technique involves extracting a multidimensional vectorial representative of an acoustic output spectrum such as is referred to in an article "Syntactic techniques for pattern recognition on sampled data signals" in IEEE Proceedings-E, Volume 139, No. 2, March 1992.

In this technique, for each spectrum there are selected a small number (say six) of measurement values (features). For example, with regard to the spectra illustrated in FIGS. 6A, 6B and 6C there are selected features represented by the power outputs at frequencies of 60, 270, 380, 460, 750 and 1800 Hz. A multidimensional vector representation of the selected features of each spectrum is then calculated and stored in digital form in a location of the data storage means 50 assigned to that spectrum.

In operation of the cash dispenser unit 16, the outputs of the data acquisition board 56 corresponding to the acoustic outputs of the microphones 38 and AE sensors 42 are applied to the CPU 4, and each of the outputs of the board 56 is converted by the CPU 4 into a digital representation of a vector representing the selected features of the corresponding spectrum. The CPU 4 has a comparator 54, and the last-mentioned digital representation is compared in the comparator 54 with the stored digital representation of the normal acoustic output of the corresponding microphone 38 or AE sensor 42. If the compared digital representations match within a predetermined tolerance, then the CPU 4 makes a determination that no malfunction is occurring in the corresponding part of the dispenser 16. If the compared digital representations do not match within the predetermined tolerance, then the digital representation corresponding to the output of the data acquisition board 56 is compared with one or more stored digital representations of an abnormal acoustic output of the corresponding microphone 38 or AE sensor 42, resulting from a malfunction of the corresponding part of the cash dispenser 16. If an appropriate match is found as a result of the last-mentioned comparison, then the CPU 4 makes a determination as to which part of the cash dispenser 16 has a malfunction and also makes a determination as to what is the nature of the malfunction. If no match is found as a result of the last-mentioned comparison, then although the CPU 4 makes a determination as to which part of the cash dispenser 16 has a malfunction, it is unable to determine the nature of the malfunction.

If the CPU 4 determines that a malfunction has occurred, then an appropriate signal is sent by the CPU 4 to the operator interface 60 or to the remote service station 62. Alternatively, the CPU 4 may take action to shut down part of the cash dispenser 16; for example, as a result of the determination that a malfunction has occurred, the CPU 4 may make a decision to shut down one of the pick mechanisms 18. The operator interface 60 provides a means for communicating the state of health of the ATM 2 to a service engineer or to an employee of the financial institution in which the ATM 2 is located. If the nature of a malfunction determined by the CPU 4 is such that the relevant part of the dispenser unit 16 is still functioning and that imminent failure of this part is unlikely to occur, then the CPU 4 sends an appropriate signal to the operator interface 60 which in turn displays information as to which part of the dispenser unit 16 is malfunctioning and also the nature of the malfunction. Appropriate action can then be taken in due course to rectify the malfunction by a service engineer or other authorized person. A typical malfunction of this nature is the belt means 95, 98 or 101, 104 being of the incorrect tension. If the CPU 4 determines that a part of the dispenser unit 16 is malfunctioning but is unable to identify the nature of the malfunction, then a signal would be sent by the CPU 4 to the operator interface 60 causing the latter simply to provide an indication that a particular part of the dispenser unit 16 is malfunctioning. It would then be necessary for the nature of the malfunction to be determined by a service engineer.

If the nature of a malfunction determined by the CPU 4 is that part of the dispenser unit 16 has failed or that imminent failure of a part is likely, then an appropriate signal is sent by the CPU 4 to the remote service station 62 which displays information indicative of the malfunction so that rapid action can be taken to rectify the malfunction. A typical malfunction of this nature is failure of one of the motors 70, 71 or 72 or a condition likely to give rise to imminent failure of one of the motors 70, 71 or 72.

It should be understood that in general the acoustic outputs of all the parts of the dispenser unit 16 being monitored by the microphones 38 and AE sensors 42 will change significantly when malfunctions occur. Prior to the ATM 2 being installed tests would be carried out to determine the spectra representing the normal acoustic outputs of the microphones 38 and AE sensors 42, and to determine the spectra representing the more commonly experienced malfunctions of the parts monitored by the microphones 38 and AE sensors 42. The digital representations, as previously described, of these various spectra are stored in the appropriate locations of the data storage means 50 prior to installation of the ATM 2.

In operation of the ATM 2, during each cash dispense transaction the operation of the relevant parts of the cash dispenser unit 16 is monitored by the microphones 38 and the AE sensors 42. As previously described, the acoustic output of each of the microphones 38 and sensors 42 is sampled by the data acquisition board 56 and the digital representation thereof is compared with the digital representation of the normal output of the microphone 38 or sensor 42 stored in the relevant location of the data storage means 50. Again as previously described, if this comparison does not give rise to a match within a predetermined tolerance, then the digital representation of the output of the microphone 38 or sensor 42 sampled by the data acquisition board 56 is compared with one or more stored digital representations of abnormal outputs of the microphone 38 or sensor 42 corresponding to one or more predetermined types of fault of the part of the dispenser unit 16 being monitored. When a fault is detected during a cash dispense transaction, an appropriate signal is sent by the CPU 4 to the operator interface unit 60 or to the remote service station 62 for the purpose of providing information that a fault or abnormal operation has occurred so that corrective action can be taken.

It will be appreciated that the acoustic sensing system described hereinbefore provides a detailed diagnosis of the state of health of the cash dispenser unit 16, and provides a warning to a service engineer or other authorized person of an abnormality that may have occurred in the operation of a monitored part of the dispenser unit 16. Also, in some situations, information may be given as to the actual nature of a fault that may have occurred so that, for example, a service engineer may have early advice as to what spare part may be required. This system will often enable corrective action to be taken in advance of a defective component or part of the dispenser unit 16 actually failing, thereby decreasing the down time of the dispenser unit 16, i.e. the time for which the unit 16 is out of service, and thereby enhancing user satisfaction. Also, it should be understood that, if desired, a low state of the contents of each cassette 20 can be detected by monitoring the output of an AE sensor 42 attached to the casing of the cassette 20. This arrangement would enable replenishment of a cassette 20 to be effected prior to the contents becoming so low that the cassette 20 has to be taken out of service, and accordingly this arrangement would further reduce the down time of the dispenser unit 16.

A wide variety of possible malfunctions, or abnormal types of operation, of the dispenser unit 16 can be detected by the acoustic sensing system, such as, for example: incorrect operation of the vacuum system resulting in a failure to pick a bank note from one or other of the cassettes 20; jamming of bank notes in the feed path 78; incorrect tensioning of the feed belt 95, 98, 102, 104 resulting in incorrect feeding of notes to, or presenting of notes at, the exit slot 14; and an actual, or possible imminent, malfunction of any of the electric motors 70, 71 and 72.

A further AE sensor could be used for detecting attempted forced entries by criminals into the safe 17 in which the dispenser unit 16 is mounted. In this arrangement, the further AE sensor is physically attached to the wall of the safe 17, and a digital representation of the normal acoustic output of this AE sensor is stored in an associated location in the data storage means 50. The acoustic output of the further AE sensor is continually monitored at regular intervals and the digital representation of this output is compared with the stored digital representation of the normal acoustic output for this sensor. If a match is not found as a result of such comparison then a warning signal is sent to the remote service station 62, so that the police can be alerted.

What is claimed is:

1. An apparatus for monitoring operation of a self-service transaction terminal which allows a customer to carry out a self-service transaction, the apparatus comprising:

at least one acoustic sensor for sensing acoustic outputs associated with operation of the self-service transaction terminal;

storage means for storing digital representations of normal acoustic outputs from the acoustic sensor corresponding to normal operation of the self-service transaction terminal; and processing means for (i) comparing digital representations of the acoustic outputs of the acoustic sensor with stored digital representations of normal acoustic outputs of the acoustic sensor, and (ii) providing an output signal indicative of abnormal operation of the self-service transaction terminal based upon comparison of digital representations of the acoustic outputs of the acoustic sensor with stored digital representations of the normal acoustic outputs of the acoustic sensor.

2. An apparatus according to claim 1, wherein the at least one acoustic sensor is a microphone or an acoustic emission (AE) sensor.

3. An apparatus according to claim 2, wherein the at least one acoustic sensor includes at least one microphone for sensing air-borne acoustic waves and at least one AE sensor for sensing structure-borne acoustic waves.

4. An apparatus according to claim 3, wherein the microphone is a unidirectional microphone.

5. An apparatus for monitoring an automated teller machine (ATM) which has a currency dispenser unit for dispensing currency to a customer to carrying out a self-service financial transaction at the ATM, the apparatus comprising:

at least one acoustic sensor for sensing acoustic outputs associated with operation of the currency dispenser unit;

storage means for storing digital representations of normal acoustic outputs from the acoustic sensor corresponding to normal operation of the currency dispenser unit; and processing means for (i) comparing digital representations of the acoustic outputs of the acoustic sensor with stored digital representations of normal acoustic outputs of the acoustic sensor, and (ii) providing an output signal indicative of abnormal operation of the currency dispenser unit based upon comparison of digital representations of the acoustic outputs of the acoustic sensor with stored digital representations of the normal acoustic outputs of the acoustic sensor.

6. An apparatus according to claim 5, wherein the at least one acoustic sensor is a microphone or an acoustic emission (AE) sensor.

7. An apparatus according to claim 6, wherein the at least one acoustic sensor includes at least one microphone for sensing air-borne acoustic waves and at least one AE sensor for sensing structure-borne acoustic waves.

8. An apparatus according to claim 7, wherein the microphone is a unidirectional microphone.

9. An automated teller machine (ATM) for allowing a customer to carry out a self-service financial transaction, the ATM comprising:
   a currency dispenser unit for dispensing currency to the customer carrying out the self-service financial transaction;
   at least one acoustic sensor for sensing acoustic outputs associated with operation of the currency dispenser unit;
   storage means for storing digital representations of normal acoustic outputs from the acoustic sensor corresponding to normal operation of the currency dispenser unit; and
   processing means for (i) comparing digital representations of the acoustic outputs of the acoustic sensor with stored digital representations of normal acoustic outputs of the acoustic sensor, and (ii) providing an output signal indicative of abnormal operation of the currency dispenser unit based upon comparison of digital representations of the acoustic outputs of the acoustic sensor with stored digital representations of the normal acoustic outputs of the acoustic sensor.

10. An ATM according to claim 9, further comprising a safe having a wall and a chamber in which the currency dispenser unit is mounted, the at least one acoustic sensor being mounted on the wall of the safe, the processing means comparing digital representations of the acoustic outputs of the acoustic sensor with stored digital representations of normal acoustic outputs of the acoustic sensor and providing an output signal indicative of an attempted forced entry into the chamber of the safe based upon comparison of digital representations of the acoustic outputs of the acoustic sensor with stored digital representations of the normal acoustic outputs of the acoustic sensor.

11. An ATM according to claim 9, wherein (i) the currency dispenser unit includes a currency cassette having a casing, and (ii) the at least one acoustic sensor is mounted on the casing of the currency cassette, the processing means comparing digital representations of the acoustic outputs of the acoustic sensor with stored digital representations of normal acoustic outputs of the acoustic sensor and providing an output signal indicative of a low state of contents of the currency cassette based upon comparison of digital representations of the acoustic outputs of the acoustic sensor with stored digital representations of the normal acoustic outputs of the acoustic sensor.

12. An ATM according to claim 9, wherein (i) the currency dispenser unit includes a suction pump associated therewith, and (ii) the at least one acoustic sensor is mounted on the suction pump, the processing means comparing digital representations of the acoustic outputs of the acoustic sensor with stored digital representations of normal acoustic outputs of the acoustic sensor and providing an output signal indicative of abnormal operation of the suction pump based upon comparison of digital representations of the acoustic outputs of the acoustic sensor with stored digital representations of the normal acoustic outputs of the acoustic sensor.

13. An ATM according to claim 9, wherein (i) the currency dispenser unit includes at least one belt associated therewith, and (ii) the at least one acoustic sensor is adjacent the belt, the processing means comparing digital representations of the acoustic outputs of the acoustic sensor with stored digital representations of normal acoustic outputs of the acoustic sensor and providing an output signal indicative of abnormal tension in the belt based upon comparison of digital representations of the acoustic outputs of the acoustic sensor with stored digital representations of the normal acoustic outputs of the acoustic sensor.

14. An ATM according to claim 9, wherein (i) the currency dispenser unit includes at least one belt associated therewith which defines a feed path along which currency can be fed, and (ii) the at least one acoustic sensor is disposed along the feed path, the processing means comparing digital representations of the acoustic outputs of the acoustic sensor with stored digital representations of normal acoustic outputs of the acoustic sensor and providing an output signal indicative of a currency jam condition along the feed path based upon comparison of digital representations of the acoustic outputs of the acoustic sensor with stored digital representations of the normal acoustic outputs of the acoustic sensor.

15. An ATM according to claim 9, wherein (i) the currency dispenser unit includes an electric motor associated therewith, and (ii) the at least one acoustic sensor is mounted on the electric motor, the processing means comparing digital representations of the acoustic outputs of the acoustic sensor with stored digital representations of normal acoustic outputs of the acoustic sensor and providing an output signal indicative of abnormal operation of the electric motor based upon comparison of digital representations of the acoustic outputs of the acoustic sensor with stored digital representations of the normal acoustic outputs of the acoustic sensor.

16. An ATM according to claim 9, wherein the at least one acoustic sensor is a microphone or an acoustic emission (AE) sensor.

17. An ATM according to claim 16, wherein the at least one acoustic sensor includes at least one microphone for sensing air-borne acoustic waves and at least one AE sensor for sensing structure-borne acoustic waves.

18. An ATM according to claim 17, wherein the microphone is a unidirectional microphone.

19. An apparatus comprising:
   a plurality of acoustic sensors for sensing acoustic outputs of different parts of the apparatus;
   storage means for storing digital representations of normal outputs of the sensors respectively corresponding to normal operation of the parts; and
   processing means for (i) comparing digital representations of the acoustic outputs of the sensors with respective stored digital representations of the normal outputs of the sensors, and (ii) based upon the comparison, providing an indication as to whether any of the sensors has an abnormal acoustic output;
   each of the sensors being a microphone or an acoustic emission (AE) sensor;
   the sensors including at least one microphone for sensing air-borne acoustic waves and at least one AE sensor for sensing structure-borne acoustic waves;

the AE sensor being physically attached to a wall of a safe;

a digital representation of the normal output of the AE sensor being stored in an associated location in the storage means;

the processing means being arranged at intervals to compare a digital representation of the acoustic output of the AE sensor with the stored digital representation of the normal output of the AE sensor, the processing means being arranged to send a warning signal to a remote station coupled to the processing means in the event of an appropriate match not being found as a result of such comparison.

* * * * *